Oct. 14, 1930.  W. B. GREENE  1,778,151
OUTLET BOX
Filed Nov. 7, 1921   3 Sheets-Sheet 1
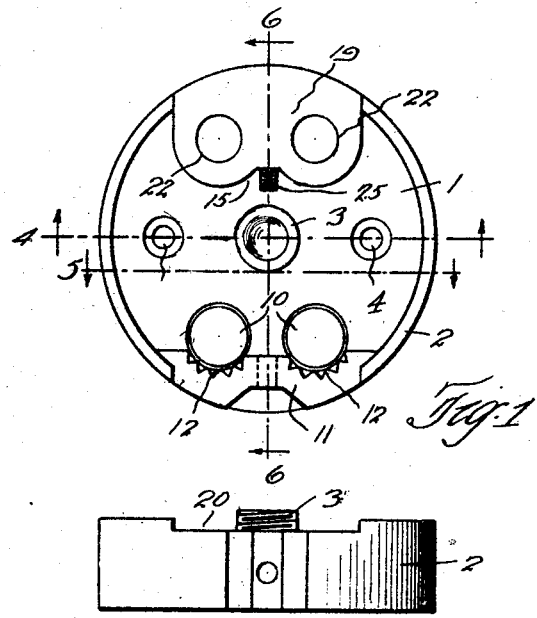
Fig. 1
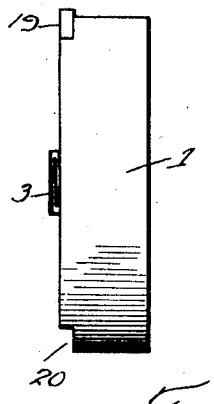
Fig. 2
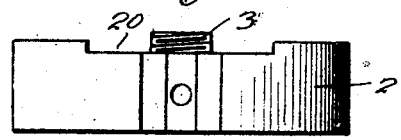
Fig. 3
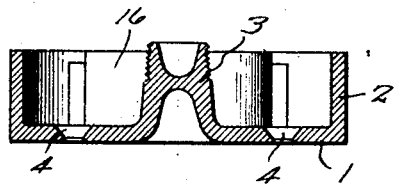
Fig. 4
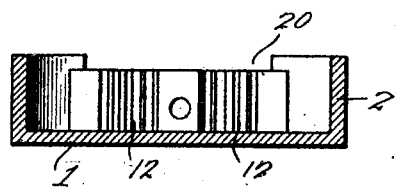
Fig. 5
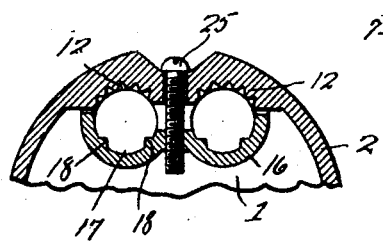
Fig. 7
Fig. 6
Inventor
William B. Greene
By Hull, Brock & West
Attys.

Oct. 14, 1930.          W. B. GREENE          1,778,151
OUTLET BOX
Filed Nov. 7, 1921          3 Sheets-Sheet 2

Inventor
William B. Greene
By Hull, Brock & West
Attys

Oct. 14, 1930.  W. B. GREENE  1,778,151
OUTLET BOX
Filed Nov. 7, 1921  3 Sheets-Sheet 3

Inventor
William B. Greene
By Hull, Brock & West
Attys

Patented Oct. 14, 1930

1,778,151

UNITED STATES PATENT OFFICE

WILLIAM B. GREENE, OF EAST CLEVELAND, OHIO; ENDA B. PRICE, ADMINISTRATRIX OF SAID WILLIAM B. GREENE, DECEASED, ASSIGNOR TO THE ADAPTI COMPANY, A CORPORATION OF OHIO

OUTLET BOX

Application filed November 7, 1921. Serial No. 513,465.

This invention relates to improvements in what are known as outlet boxes, a class of devices used in electrical wiring as junctions between conduit sections through which electrical wires are led, the boxes affording convenient access to the wiring at various points as where it is desired to install fixtures, and usually including means for supporting the fixtures.

The aims of my invention are to provide an outlet box incorporating a very efficient clamp for securing the conduits to the box, the clamp proper being composed of a jaw fixed with respect to the box and a jaw movable toward and from the fixed jaw and cooperating with a part of the box in such manner as to transmit through the movable clamp to the box any strains imposed upon the conduit, and to prevent the movable jaw from tilting, thereby adding greatly to the strength and effectiveness of the clamp; to provide a clamp for outlet boxes wherein the gripping action becomes more powerful gradually inwardly from the end of the conduit; to provide actuating means for the clamp which is operable from the outside of the box, the box being so designed as to accommodate within its regular outline said actuating means so as to avoid protruding parts; and a further object is to provide an outlet box composed of separable and preferably interchangeable elements which may be brought together about a gas pipe or the like from which a fixture is suspended without the necessity of removing the fixture or disconnecting the pipe. This last mentioned feature is of particular value when wiring a structure already piped for gas.

Figure 8:
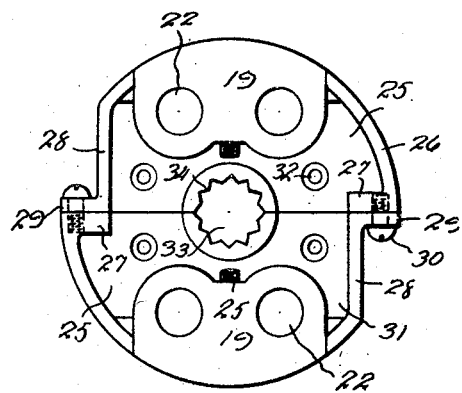
Figure 9:
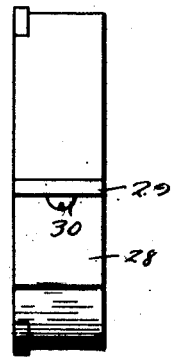
Figure 10:
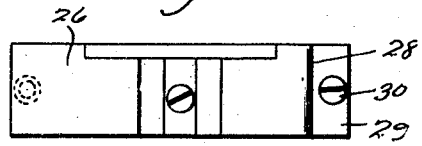
Figure 11:
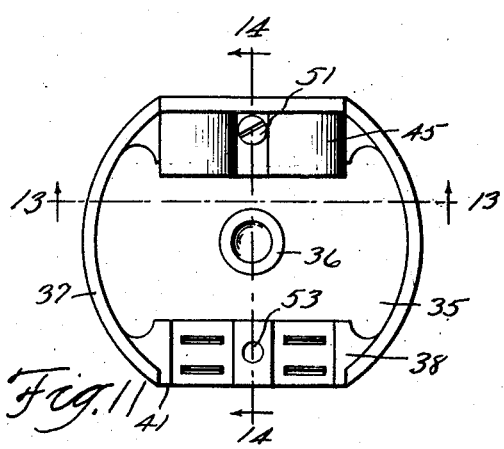
Figure 12:
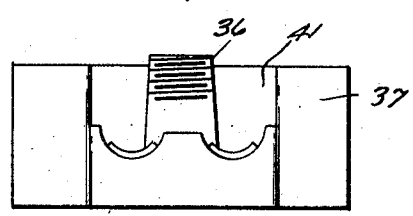
Figure 13:
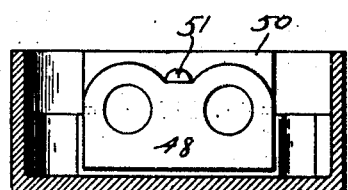
Figure 14:
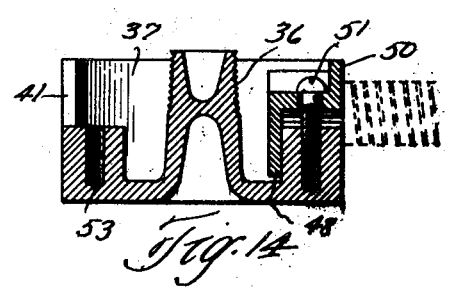
Figure 15:
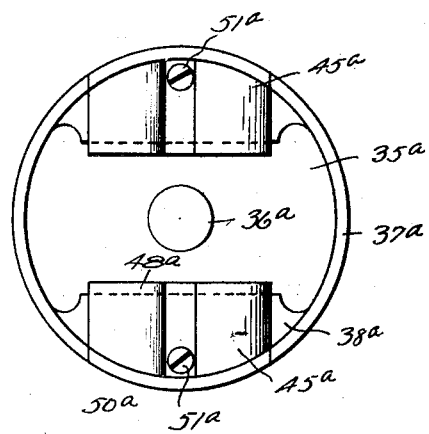
Figure 17:
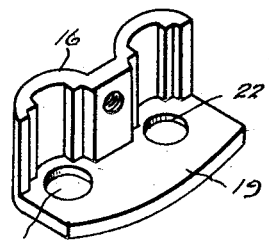
Figure 18:
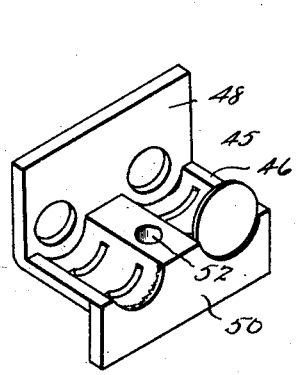
Figure 16:
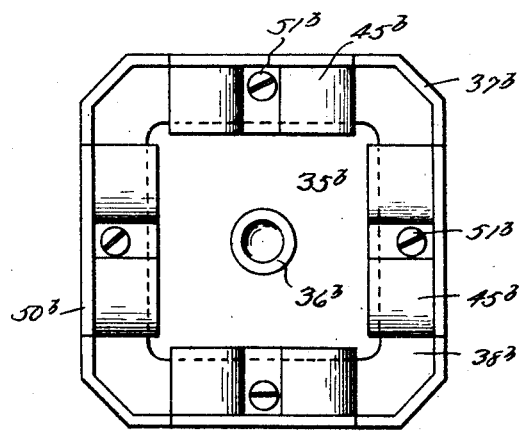

The foregoing objects, and others which will appear as this description proceeds, are attained in the embodiments of the invention illustrated in the drawings accompanying and forming a part hereof and wherein Fig. 1 is a plan of my improved outlet box showing the open side thereof; Figs. 2 and 3 are elevational views, the former being taken as from the right of Fig. 1 and the latter as from below Fig. 1; Figs. 4, 5 and 6 are sectional views on the correspondingly numbered lines of Fig. 1, each view being taken as though looking in the direction indicated by the arrows associated with its respective section line; Fig. 7 is a section on the line 7—7 of Fig. 6; Figs. 8, 9 and 10 are views similar to Figs. 1, 2 and 3 respectively, of a modified form of the box; Fig. 11 shows my invention incorporated in an outlet box having conduit openings in the peripheral wall, in contra distinction to the box illustrated in the previous views when said openings occur in the end or circular wall; Fig. 12 is a side elevation of the box shown in Fig. 11; Figs. 13 and 14 are sections on the respective lines 13—13 and 14—14 of Fig. 11; Figs. 15 and 16 are elevational views of other designs of the class of box having the conduit openings in the peripheral wall; and Figs. 17 and 18 are perspective views of the movable clamping jaws that are used in the two classes of boxes shown respectively in Figs. 1 to 10 and 11 to 16.

In Figs. 1 to 7 I have shown my improvements incorporated in a one-piece box comprising a circular wall 1 surrounded by a cylindrical wall 2. A fixture supporting a stud 3, shown as externally threaded, projects from the center of the wall 1 in the same direction as wall 2 so that when the box is installed with the circular wall 1 against a ceiling, the stud depends in a position to support a fixture. The circular wall 1 is further provided with screw receiving apertures 4 by means of which the box is attached to the ceiling or other supporting surface. Shown as situated at diametrically opposite points of the circular wall 1 are pairs of knock-out plugs 10, and shown as formed of a thickened portion of the cylindrical wall 2 adjacent each pair of knock-out plugs 10 is the fixed jaw 11 of my improved clamp. This jaw has conduit seats 12 of a contour approximating that of a conduit and arranged preferably concentric with respect to the corresponding knock-out plugs so that when the knock-out plugs are removed and the ends of conduits are inserted through the openings thus formed, the sides of the conduits will be disposed against the seats 12. The seats are shown as corrugated so as to have a better grip upon the conduit.

A movable clamping jaw 15 is associated with each of the fixed jaws 11 and the same comprises a side wall 16 (Fig. 17) formed with seats 17 which are opposed to the seats 12 of the fixed jaw. These seats are also provided with ribs or corrugations 18. An end wall 19 extends from the side wall 16 over the top of the fixed jaw and its edge portion opposite the wall 16 occupies a notch 20 in the wall 2 which notch is substantially equal to the circumferential extent of the corresponding fixed jaw. The wall 19 has openings 22 for the passage of the wires, and these openings are substantially equal to or slightly less than the internal diameter of the conduit so that, in the case of metal or so called armored conduit, the ends of the conduit abut the wall 19 about the openings 22 and the wires, insulated as they are, are protected against chafing against the edges of the conduit, the walls of the apertures 22 being rounded or otherwise formed for smoothness so as not to injure the insulation of the wires.

A screw 25 passes freely through a hole in the central part of each of the fixed clamping jaws 11 and is threaded through a tapped aperture in the corresponding part of the movable jaw so that by turning the screw by the application of a screw driver to the head thereof exteriorly of the box the movable jaw may be drawn toward the fixed jaw and thereby effectually clamp the ends of the conduits between the conduit seats of the respective jaws. Attention is called to the fact that the screw 25 is situated as near as practicable to the circular wall 1, or, in other words, as far back as it is feasible to place it from the ends of the conduits when they occupy the clamp. This is for the purpose of creating a greater gripping action on the conduits at points some distance inward from their ends than at the extreme ends thereof so that the effect is to produce a very slight and gradual yet nevertheless perceptible enlarging of the conduit from the region of the circular wall 1 toward the outer ends of the clamping jaws resulting, as will be clearly understood, in materially enhancing the anchorage of the conduits to the box. Attention is also directed to an important feature of the invention residing in the engagement of the wall 19 of each of the movable jaws over the outer end of the corresponding fixed jaw so that any strain imposed upon the conduit will be transmitted, through the movable jaw, to the substantial box structure, thus further increasing the effectiveness of the hold upon the conduit.

The box illustrated in Figs. 8, 9 and 10 differs from the one above described in being formed of two identical half sections 25 which meet in a plane coincident with the central axis of the box. Each half section has a peripheral wall 26, corresponding to the wall 2 of the former box, and at one end the wall terminates in an inwardly directed flange 27 and near its other end is turned inwardly at 28 to join the inner end of a flange 29 in the plane of the former flange 27. When the two sections are brought together the flanges 27 of one engage the flanges 29 of the other, and the abutting flanges of the two sections are provided with aligning apertures through which screws 30 are engaged, the heads of the screws being accommodated within the angles between the flanges 29 and the wall portions 28. The substantially semi-circular walls 31 of the half sections 25 have screw receiving apertures 32, equivalent to the apertures 4 of the former modification. The straight edges of the walls 31 are notched at their middle portions so that when they are brought together they define an opening 33, and the edges of these openings are preferably provided with teeth 34. Each of the box sections 25 incorporates a clamp similar to that described in connection with the embodiment illustrated in Figs. 1 to 7 and accordingly bear the same reference numerals.

By making the box in half sections as just described, it enables the workman to assemble it about a gas pipe or the like without disconnecting the pipe, or removing any fixture therefrom which may be suspended from the pipe. The teeth 34 embed themselves into the pipe sufficiently to prevent dislocation of the box after the sections thereof have been firmly drawn together.

The type of box illustrated in Figs. 11 to 14 comprises an approximately circular wall 35 from which extend in the same direction a central fixture stud 36 and a peripheral wall 37. At diametrically opposite points the peripheral wall 37 has thickened portions constituting fixed clamping jaws 38 that are shown as of a depth substantially half that of the box and as having a pair of semi-cylindrical conduit seats 39 provided with corrugations 40. The axes of these seats are at right angles to the axis of the box and accordingly afford conduit openings entering through the peripheral wall 37. The box is flattened along the outer side of each fixed jaw, and the peripheral wall is cut away at these points to provide notches 41 (see Fig. 12).

A movable jaw 45, shown in perspective in Fig. 18, is designed for cooperation with each fixed jaw, and it comprises a body portion 46 having corrugated conduit seats 47, an end wall 48 that is provided with apertures 49 in concentric relation to the seats 47, and a flange 50 that projects from the end of the body portion remote from the end wall 48 and in a direction opposite to that of said wall.

When the jaw 45 is applied to the box, the end wall 48 overhangs the inner end of the fixed jaw 38 and the flange 50 occupies the adjacent notch 41 in the peripheral wall 37, thus closing it. A screw 51 passes freely through an aperture 52 in the movable jaw and is threaded into a tapped hole 53 in the central portion of the fixed jaw, and by means of this screw the movable jaw may be clamped firmly upon the ends of conduits led in through the side of the box between the seats of the opposed jaws 38 and 45 with their ends abutting the wall 48 about the apertures 49.

The box shown in Fig. 15 is practically identical with that first described, the only difference being that it is entirely circular. It requires a modification of the clamping jaw 45 to the extent of making the flanged end of the body portion 46 curved on the radius of the box. The present form carries the same reference numerals as are used in connection with the modification immediately above described, augmented by the exponent "a". An advantage of the present design is that it permits locating the screw 51ª well back from the inner ends of the clamping jaws for a purpose already explained.

Fig. 16 shows a polygonal box employing four clamps. The parts are designated by the same reference numerals used with the corresponding elements of the previously described form, having added to them the exponent "b".

Prior to adapting the boxes for use, the conduit openings occurring at the outer ends of the clamps in the forms of my invention illustrated in Figs. 11 to 16 are preferably closed by suitable "knockout" plugs which may be carried either by the box or by the movable jaws. I have shown one of such "knockout" plugs at 55 in Fig. 18.

Having thus described my invention, what I claim is:

1. An outlet box having a conduit opening in one of its walls and a conduit seat adjacent thereto, a clamping jaw arranged within the box, said clamping jaw having a conduit seat opposed to that of the box and an overhanging portion on said clamping jaw adapted to engage over a portion of the wall, means for drawing said clamping jaw toward the conduit seat of the box.

2. An outlet box having a conduit opening in one of its walls and a conduit seat in operative relation to said opening, a clamping jaw comprising a side wall having a conduit seat opposed to that of the box, a top wall extending from the side wall over the top of the outlet box, and means for drawing the clamping jaw toward the conduit seat of the box.

3. An outlet box comprising walls disposed at right angles to each other, one of said walls having a conduit receiving opening and the other a conduit seat in operative relation to said opening, a clamping jaw situated in opposed relation to said seat and having a part engaged over the wall that is provided with the conduit seat, and means for drawing the jaw toward the seat.

4. An outlet box comprising walls disposed at substantially right angles to each other, the first wall having a conduit opening and the second a conduit seat in operative relation to said opening, the second wall being cut away at the end of the seat remote from the first wall, a clamping jaw in opposed relation to the seat and having a part overhanging the end thereof and occupying the aforesaid cut away portion of the second wall, said part of the jaw being provided with an opening arranged substantially in axial alignment with the conduit opening of the first wall, and means for drawing the jaw toward the conduit seat of the box.

5. An outlet box comprising walls disposed at substantially right angles to each other, the first of said walls having a conduit opening and the second having a conduit seat in operative relation to said opening, a clamping jaw having a conduit seat opposed to that of the second wall and having a part overhanging an end of the seat of the second wall, said part of the jaw having an opening for the passage of wires, the opening being substantially in axial alignment with the conduit receiving opening of the first mentioned wall, the second wall having an aperture adjacent the first wall and the jaw, a tapped hole in register with said aperture, and a screw passing freely through the aperture and engaged within the tapped hole, the exterior of the second wall being recessed for the accommodation of the head of said screw whereby the head of the screw is within the regular outline of the box.

6. An outlet box comprising walls disposed at substantially right angles to each other, the first of said walls having a pair of conduit openings and the second having conduit seats in operative relation to said openings, the second wall being cut away beyond the end of the seat remote from the first wall, a clamping jaw having conduit seats opposed to those of the second wall and having a part overhanging the end of the seats and occupying the aforesaid cut-away portion of the second wall, said part of the jaw having openings for the passage of wires, the openings being substantially in axial alignment with the conduit openings of the first mentioned wall, the second wall having an aperture adjacent the first wall and the jaw, a tapped hole in register with said aperture, and a screw passing freely through the aperture and engaged within the tapped hole, the exterior of the second wall being recessed for the accommodation of the head of said screw whereby the head of the screw is within the regular outline of the box.

7. An outlet box comprising a circular wall and a peripheral substantially cylindrical wall that is thickened at diametrically opposite points to provide fixed jaws, the circular wall having a pair of conduit receiving openings adjacent each of said fixed jaws, and the fixed jaws having corrugated conduit seats in operative relation to the conduit openings, the fixed jaws being of a depth less than that of the box and the peripheral wall being cut away throughout the circumferential extent of each of the fixed jaws, a movable jaw associated with each of the fixed jaws and comprising a wall having corrugated conduit seats opposed to those of the fixed jaw and an end wall which overhangs the end of the fixed jaw and occupies the adjacent cut away portion of the peripheral wall, the end wall of each of the movable jaws having openings for the passage of wires, the fixed jaw having an aperture adjacent the circular wall of the box, and the movable jaw having a tapped hole in register with said aperture, and a screw passing freely through said aperture and threaded into said tapped hole, the exterior of the fixed wall being recessed for the accommodation of the head of the screw whereby the head of the screw is disposed within the circular outline of the box.

In testimony whereof, I hereunto affix my signature.

WILLIAM B. GREENE.